United States Patent
Gardner et al.

(10) Patent No.: US 6,926,656 B2
(45) Date of Patent: Aug. 9, 2005

(54) METHOD AND APPARATUS FOR FABRICATING CORRUGATED COMPOSITE STIFFENERS

(75) Inventors: Slade H. Gardner, Fort Worth, TX (US); Ronald L. Price, Burleson, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 33 days.

(21) Appl. No.: 10/925,454

(22) Filed: Aug. 25, 2004

(65) Prior Publication Data

US 2005/0020426 A1 Jan. 27, 2005

Related U.S. Application Data

(63) Continuation of application No. 09/998,890, filed on Oct. 25, 2001, now abandoned.

(51) Int. Cl.[7] ................................................. B31F 1/20
(52) U.S. Cl. .................. 493/463; 493/123; 264/257; 264/258; 264/310; 264/503; 156/196; 156/205; 156/228
(58) Field of Search ........................ 156/196, 205, 156/228, 245, 286, 446, 242; 493/463, 465, 101, 123, 259, 315; 264/257, 258, 310, 313, 503, 505, 510, 511

(56) References Cited

U.S. PATENT DOCUMENTS 2,210,985 A * 8/1940 Alessandro ................. 264/324
2,586,481 A * 2/1952 Rooksby et al. ............ 264/505
3,477,894 A * 11/1969 Pausch et al. .............. 156/459
3,990,935 A * 11/1976 Lehmann .................... 156/472
4,381,212 A * 4/1983 Roberts ...................... 156/473
4,510,010 A * 4/1985 Schramm et al. ........... 156/383
4,642,087 A * 2/1987 Hoffmann ................... 493/463
5,351,615 A * 10/1994 Kobler et al. ............... 101/217
5,543,199 A * 8/1996 Fell ............................ 428/116
5,843,355 A * 12/1998 McCarville et al. ........ 264/152
5,882,462 A * 3/1999 Donecker et al. ........... 156/205
6,006,806 A * 12/1999 Marschke ................... 156/472
6,170,549 B1 * 1/2001 Marschke ................... 156/472
6,173,496 B1 * 1/2001 Makoui et al. ............. 29/895.21

* cited by examiner

Primary Examiner—Sameh H. Tawfik
(74) Attorney, Agent, or Firm—Bracewell & Patterson, L.L.P.

(57) ABSTRACT

An apparatus and method for fabricating corrugated composite stiffeners provides a base tool having grooves formed in an outer surface and a roller having a rotating shaft and a removable, lobed, elastomeric member surrounding the shaft. The lobes of the elastomeric member form a radial array around the shaft and match the contours of the grooves in the base tool. A section of prepreg fabric is placed between the roller and the base tool, and the roller is rotated to sequentially engage the lobes with the grooves, the lobes pressing the fabric into the grooves, the fabric conforming to the contours of the grooves. Several layers of fabric are applied, then the elastomeric member is released from the shaft, laid out flat, and placed on the fabric on the base tool, the lobes locating in the grooves. The base tool, fabric, and elastomeric member are enclosed in a vacuum bag and heated to cure the fabric.

19 Claims, 3 Drawing Sheets

METHOD AND APPARATUS FOR FABRICATING CORRUGATED COMPOSITE STIFFENERS

CROSS REFERENCE TO RELATED APPLICATION

This application is a continuation of Ser. No. 09/998,890, filed Oct. 25, 2001; ABN.

BACKGROUND OF THE INVENTION

1. Field of the Invention

This invention generally relates to the field of materials construction and, more specifically, to an apparatus and method for constructing a corrugated composite stiffener.

2. Description of the Prior Art

Composite structures are desirable in many industries for many applications. For example, aircraft, space, and land/sea vehicles employ a variety of curved and multiple-contoured surface structures in their fabrication. Composite materials are commonly used for these structures because, among other desirable attributes, composite materials have high strength-to-weight ratios. Even so, composite structures formed from composite materials still need to be stiffened in some instances. Therefore, manufacturers of composite structures are continually searching for better and more economical ways of stiffening composite structures.

There are various systems and methods of stiffening composite structures. For example, in an aircraft context, hat and blade stiffeners are sometimes utilized. A blade stiffener is a thin element, often T-shaped in cross-section, that is affixed to a structure. The upper portion of the T-shape is affixed to the structure. The leg of the T-shape forms the blade and extends outward away from the structure, the stiffener extending along the length of the structure. The blade increases the moment of inertia of the entire cross-section to increase stiffness. Likewise, a hat stiffener has a three-dimensional cross-section that is typically symmetrical. The hat cross-section usually has a center portion from which two legs depend and terminate in feet. The hat stiffener may be attached to the structure at either the feet or the center portion. A problem with hat and blade stiffeners is that they can have special peel problems at their ends. Furthermore, when utilizing hat and blade stiffeners for strength in perpendicular directions, it becomes very expensive from a manufacturing standpoint because hat and blade stiffeners do not lend themselves well to criss-cross patterns.

Another common stiffening method is the use of honeycomb structures. However, honeycomb structures are usually manufactured as a sandwich structure, which means that they can trap moisture within them, leading to degradation, and are limited in depth because of volume and weight considerations. In addition, manufacturing honeycomb structures can be very expensive.

An additional method of stiffening composite structures is the use of corrugated stiffeners bonded to the structures. However, prior methods of constructing corrugated composite stiffeners are limited to hand layups, which are time consuming and produce stiffeners of uneven quality. Corrugated stiffeners of other materials, e.g., paper, may be created by feeding the material between toothed rollers, the teeth engaging and pressing the desired shape into the material. This method is not useful for resilient materials, such as prepreg composites.

SUMMARY OF THE INVENTION

An apparatus and method for fabricating corrugated composite stiffeners provides a base tool having grooves formed in an outer surface and a roller having a rotating shaft and a removable, lobed, elastomeric member wrapped around the shaft. The lobes of the elastomeric member form a radial array around the shaft and match the contours of the grooves in the base tool. A section of prepreg fabric is placed between the roller and the base tool, and the roller is rotated and moved along the tool to sequentially engage the lobes with the grooves. The lobes press the fabric into the grooves with the fabric conforming to the contours of the grooves. Several layers of fabric are applied, then the elastomeric member is unwrapped from the shaft and placed on the fabric on the base tool, the lobes locating in the grooves. The base tool, fabric, and elastomeric member are enclosed in a vacuum bag and heated to cure the fabric.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
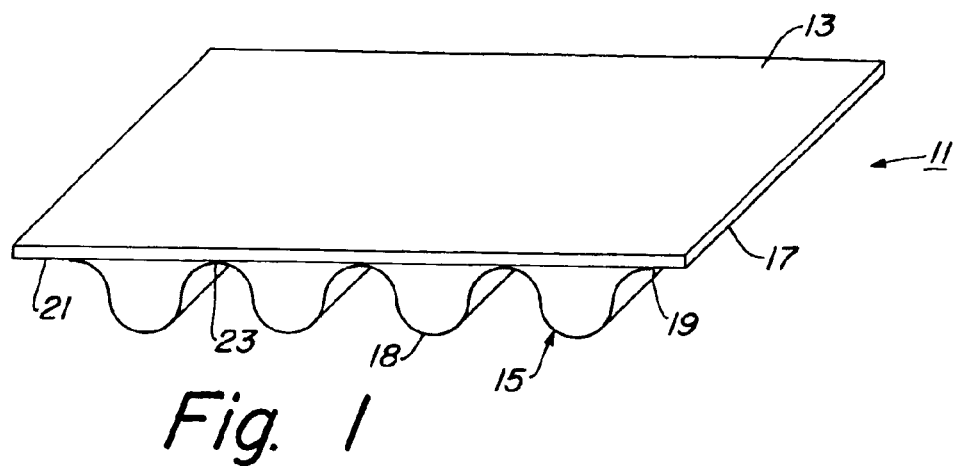
FIG. 1 is a perspective view of a composite skin stiffened by a corrugated composite stiffener constructed in accordance with the present invention.
Figure 8:
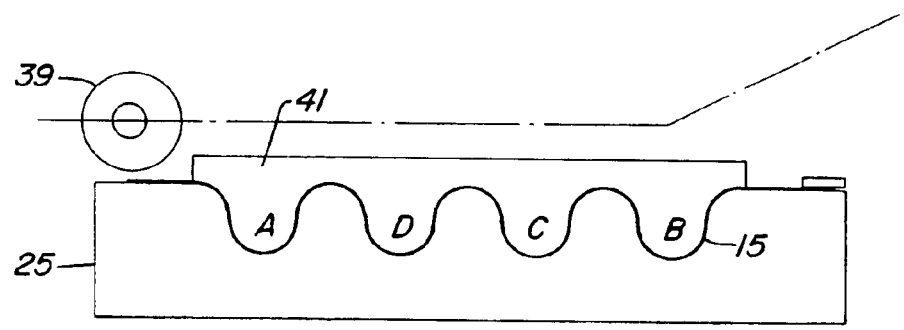
FIG. 8 is a schematic side view showing the sixth step of a method of fabricating a corrugated stiffener and using the tool of FIG. 2.
Figure 9:
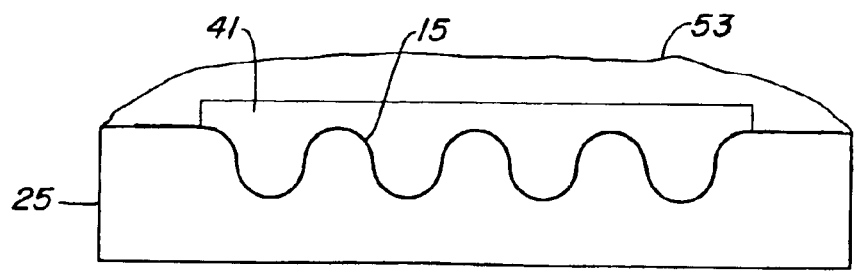
FIG. 9 is a schematic side view showing the seventh step of a method of fabricating a corrugated stiffener and using the tool of FIG. 2.

As shown in FIG. 1, panel 11 comprises a skin 13 and an undulating, or corrugated, laminate stiffener 15 bonded to inner surface 17 of skin 13. Skin 13 is preferably a composite laminate requiring stiffening for flexural loading, though skin 13 may be formed from other rigid materials, for example, aluminum. While skin 13 is shown as generally flat, skin 13 may also be curved around lines parallel to corrugated ribs 18 of stiffener 15. Stiffener 15 is shown as having four ribs 18, though stiffener 15 may have more or less ribs 18. Stiffener 15 is 41 may be removed from shaft 39 by releasing the ends at joint 45. When removed and laid flat, as shown in FIGS. 8 and 9, lobes 43 having the same dimensions as grooves 33. When wrapped around shaft 39, the linear distance along the curved contour between the crests of two lobes 43 is the same as the linear distance between the roots of two grooves 43.

Figure 2:
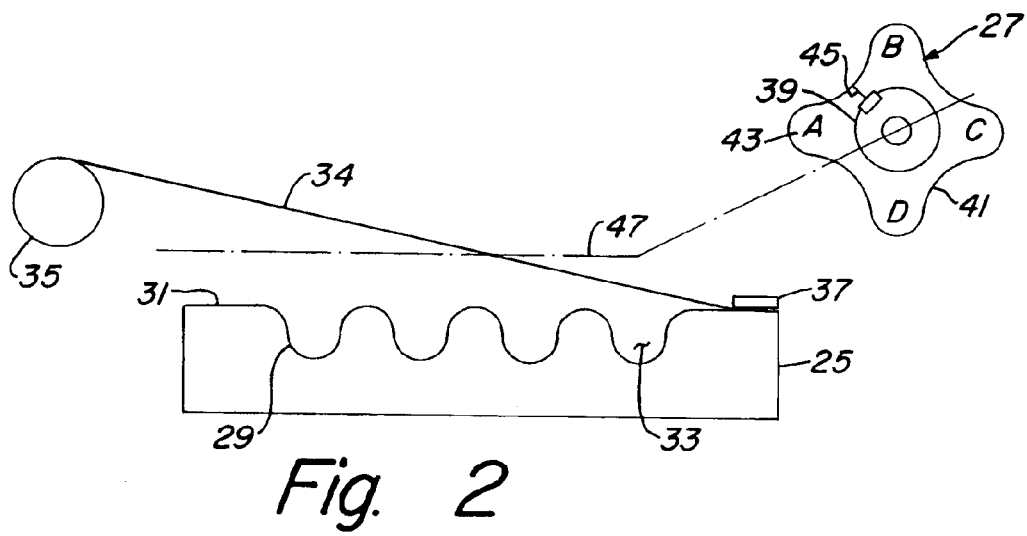
FIG. 2 is a schematic side view of an apparatus for fabricating a corrugated stiffener in accordance with the present invention

Referring to FIG. 2, stiffener 15 is formed using base tool 25 and compaction roller 27. Tool 25 is formed from typical composite tooling material and has an undulating pattern 29 formed in an upper surface 31 for forming ribs 18 of stiffener 15 (FIG. 1). As shown in FIGS. 2 through 9, pattern 29 has four grooves 33, though pattern may have more or less grooves 33. Grooves 33 may also be configured, for example, to have a sharply angled profile instead of a smooth, sine-wave-like profile. Resin-impregnated, or "prepreg," fabric or tape 34 is carried on a supply roll 35, which is located near one end of tool 25, for dispensing tape 34 in a direction perpendicular to ribs 18 during fabrication of stiffener 15. A clamp 37 is located on the end of tool 25 opposite supply roll 35 and retains tape 34 for maintaining tension on tape 34 during fabrication.

Roller 27 comprises rotating shaft 39 and a surrounding elastomeric member 41. Shaft 39 has a circular cross-section and rotates on its central axis, member 41 rotating with shaft 39. Member 41 has four lobes 43, labeled "A" through "D," extending from its outer surface, though member 41 may have more or less lobes 43 to preferably match the number of grooves 33 in tool 25. Lobes 43 are shown as having a continuous, sine-wave profile, but lobes 43 may have other shapes to conform to grooves 33 of tool 25. Member 41 is formed as a generally-planar strip and is wrapped around shaft 39, the ends of member 41 aligning and being releasably secured at joint 45. Member 41 may be removed from shaft 39 by releasing the ends at joint 45. When removed and laid flat, as shown in FIGS. 9 and 10, lobes 43 having the same dimensions as grooves 33. When wrapped around shaft 39, the linear distance along the curved contour between the crests of two lobes 43 is the same as the linear distance between the roots of two grooves 43.

The central axis of roller 27 translates along path 47, which has a portion inclining downward toward the first groove 33 and a second portion that is straight and parallel with the tops of grooves 33. As shown in FIGS. 2 through 8, roller 27 moves first into contact with tool 25, then rotates to sequentially engage lobes 43 with grooves 33 for each layer of tape 34, the central axis translating along a generally-linear path. After each groove 33 has been engaged by a lobe 43 for a given layer of tape 34, roller 27 is returned to a position away from tool 25, then moved back along path 47 when the next layer of tape 34 is ready to be applied.

The steps for forming stiffener 15 are shown in FIGS. 2 through 9. Referring to FIG. 2, tape 34 is unrolled from supply roll 35 to a distance sufficient to cover tool 25 and extend to clamp 37. The end of tape 34 is inserted into clamp 37 and is retained therein using friction. Supply roll 35 is biased to maintain a controlled, preferably-constant tension on tape 34 during fabrication of stiffener 15. Roller 27 is assembled with member 41 being wrapped around shaft 39, and roller 27 is located at the upper end of path 47.

Figure 3:
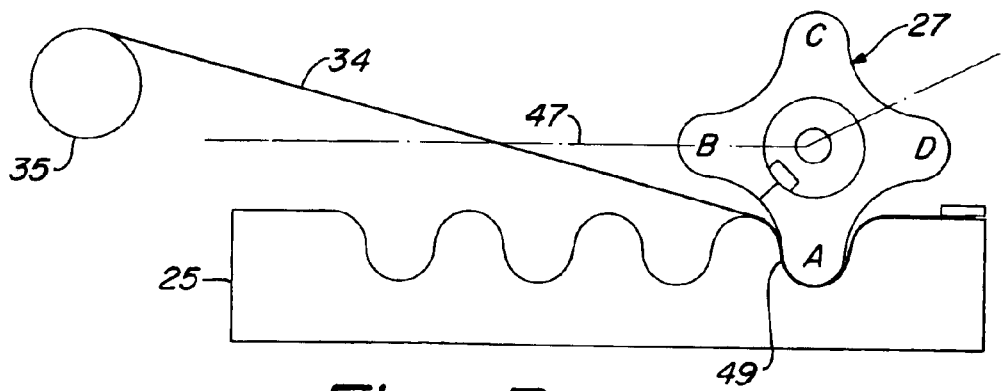
FIG. 3 is a schematic side view showing the first step of a method of fabricating a corrugated stiffener and using the tool of FIG. 2.

In FIG. 3, roller 27 has moved into engagement with tool 25, lobe A having pushed tape 34 into the first groove 33 to begin forming the first layer of stiffener 15. Though lobe A is shown as engaging the first groove 33, any of lobes A, B, C, D can engage the first groove 33 on a given pass of roller over tool 25. Roller 27 moves along the horizontal portion of path 47 as roller 27 rolls over tool 25, roller 27 moving at a preferably-constant rate. Tape 34 is located between roller 27 and tool 25 and conforms to the shape of the first groove 33 as lobe A rotates into and out of the first groove 33. Supply roll 35 maintains a constant tension on tape 34, the tension being opposed by a contact point 49 between roller 27 and tool 25. Contact point 49 advances along grooves 33 of pattern 29 and lobes A, B, C, D as roller 27 engages grooves 33.

Figure 4:
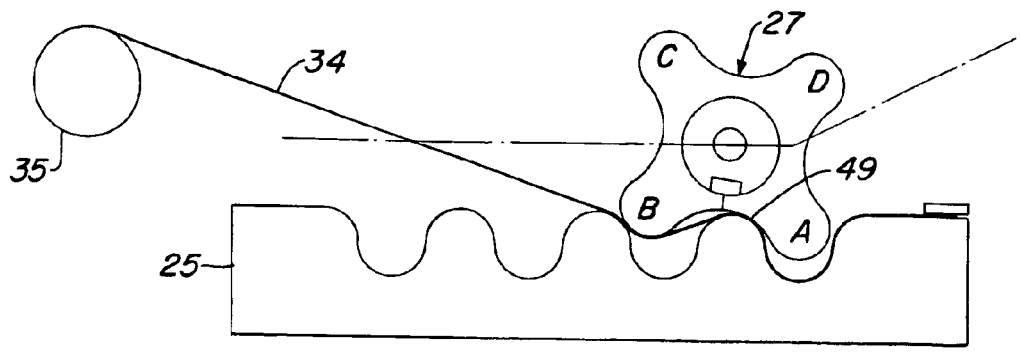
FIG. 4 is a schematic side view showing the second step of a method of fabricating a corrugated stiffener and using the tool of FIG. 2.
Figure 5:
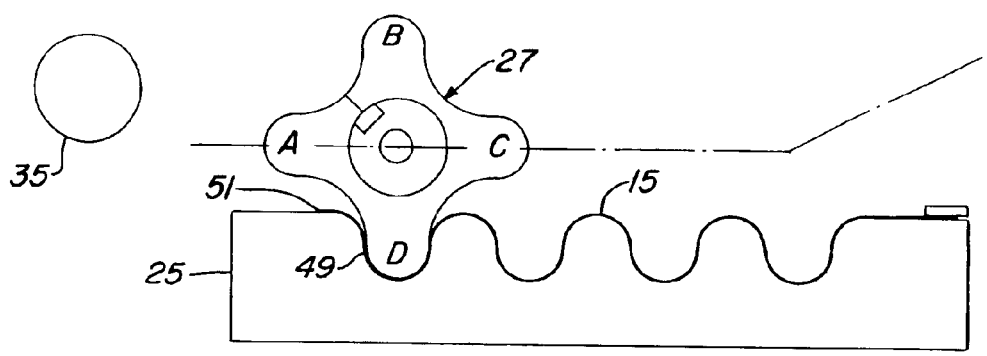
FIG. 5 is a schematic side view showing the third step of a method of fabricating a corrugated stiffener and using the tool of FIG. 2.
Figure 6:
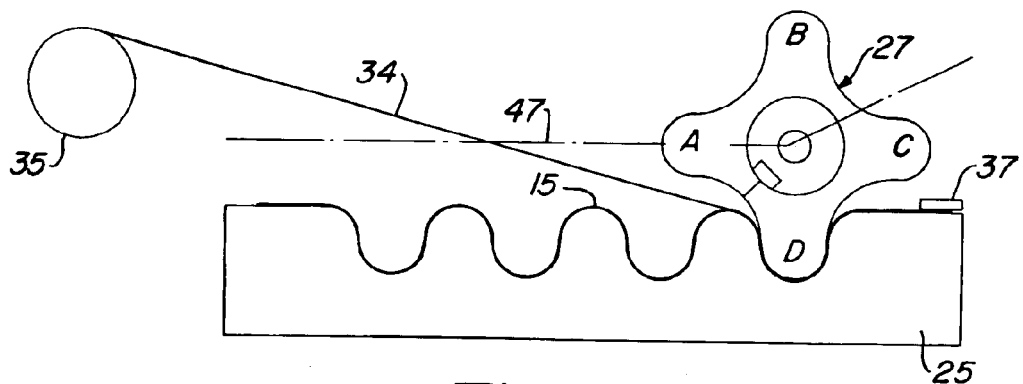
FIG. 6 is a schematic side view showing the fourth step of a method of fabricating a corrugated stiffener and using the tool of FIG. 2.

Roller 27 is shown in FIG. 4 as having rotated approximately 45°, with lobe A beginning to rotate out of the first groove 33 and lobe B beginning to rotate into the second groove 33. Contact point 49 has moved upward in the first groove 33 and towards the second groove 33. Lobe B is beginning to pull an adjacent section of tape 34 downward into the second groove 33, lobe B causing tape 34 to conform to the second groove 33 as did lobe A in the first groove 33. This sequence repeats for lobe C in the third groove 33 and for lobe D in the fourth groove 33. FIG. 5 shows the end of the laying of the first layer of tape 34. Lobe D of roller 27 is located within the fourth groove 33 and has pressed tape 34 against the outer walls of the fourth groove 33. The tension in tape 34 is released, and the portion of tape 34 on tool 25 has been cut from the remainder of tape 34 located on roll 35, leaving free end 51 as the termination of the first layer of stiffener 15.

To begin the second layer of tape 34, roller 27 is moved back to the beginning of path 47. A second layer of tape 34 is dispensed from roll 35 and retained within clamp 37. Roller 27 is moved toward tool 25 until lobe D engages the first groove 33, though roller 27 can be rotated such that any of lobes A, B, C, D engage the first groove 33. Roller 27 translates along path 47 and rotates for lobes D, A, B, and C to engage the first through the fourth grooves, respectively, conforming tape 34 to pattern 29 as described above for the first layer of tape 34. As many layers as necessary can be laid on tool 25 to produce a desired thickness of stiffener 15.

Figure 7:
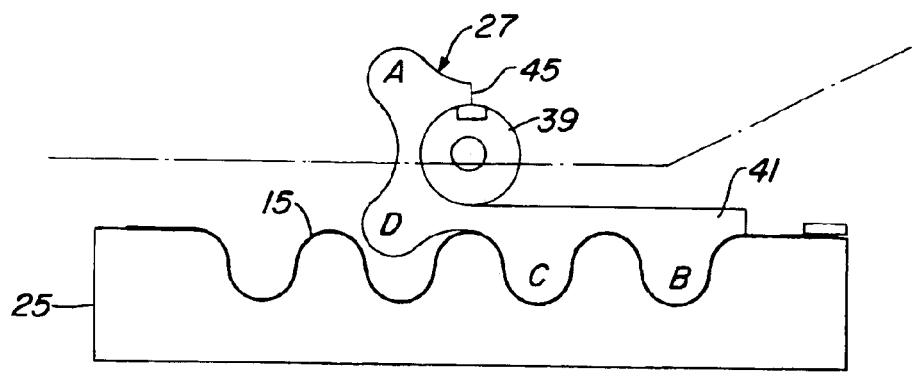
FIG. 7 is a schematic side view showing the fifth step of a method of fabricating a corrugated stiffener and using the tool of FIG. 2.

Once the desired number of layers of tape 34 are applied, stiffener 15 is compacted and cured. FIGS. 7 through 9 show this process, in which member 41 is detached from shaft 39 and laid flat against the upper layer of stiffener 15 on tool 25. In FIG. 7, member 41 is being unrolled from around shaft 39 after joint 45 is separated, lobe B being aligned with and engaging the first groove 33 and allowing for lobes A, C, and D to engage the other grooves 33. FIG. 8 shows member 41 fully unrolled from shaft 39 and covering stiffener 15 on tool 25.

The final step for forming stiffener 15 is to enclose tool 25 and member 41 in a vacuum bag 53 for compacting stiffener 15 during curing. The air is removed from bag 53, and the outside air pressure forces member 41 toward tool 25, compacting the layers of stiffener 15. Preferably, the assembly is then placed in an autoclave to provide heat and additional pressure during curing of the resin in stiffener 15. After curing, bag 53 and member 41 are removed, and stiffener 15 is lifted from tool 25. Stiffener 15 is then trimmed to fit the skin that requires stiffening and bonded to the skin, as shown in FIG. 1. The compaction steps may also be done after several layers of tape 34 have been applied and before applying additional layers of tape. Stiffener 15 is then cured after the final layers of tape 34 are applied.

The advantages to using the present invention are many. The tools and semi-automated method for producing corrugated stiffeners will reduce the time needed to produce these stiffeners and improve the quality control during manufacture. The elastomeric member may be used in debulking steps between applications of layers, as well as in a final compaction and curing step. The tools are adaptable to a range of patterns of grooves and lobes and can be scaled in size to meet application requirements.

While the invention has been shown in only some of its forms, it is not thus limited but is susceptible to various changes and modifications without departing from the spirit thereof. For example, the base tool may have a curvature in its upper surface for producing curved stiffeners. Also, rather than releasing the elastomeric member from the shaft after it has pressed the layers into the grooves, a separate elastomeric strip could be laid flat across the grooves to apply pressure.

We claim:

1. A method of fabricating a corrugated laminate panel, comprising:
    (a) providing a base tool having contoured grooves in an outer surface;
    (b) providing a roller having a rotating shaft and a lobed member mounted on the shaft, the lobed member wrapped around the shaft and releasably secured at opposing ends of the lobed member and having lobes that match the contours of the grooves;
    (c) aligning a layer of prepreg fabric with the grooves of the base tool, the fabric being located between the base tool and the roller; then
    (d) moving the roller across the grooves of the base tool, sequentially engaging each of the grooves and pressing the fabric into the grooves with the lobes; then
    (e) curing the fabric.

2. The method of claim 1, further comprising:
    prior to step (e), repeating steps (c) and (d) with additional layers of fabric to form a multilayered panel.

3. The method of claim 1, further comprising:
    maintaining a selected tension in the fabric as the lobes press the fabric into the grooves.

4. The method of claim 1, wherein:
    step (e) comprises enclosing the base tool, the lobed member, and the fabric within a vacuum bag, and withdrawing air from within the bag, air pressure outside of the bag compacting the fabric, and then applying heat and additional pressure to the fabric.

5. The method of claim 1, wherein:
    steps (a) and (b) comprise providing the grooves of the base tool and the lobes of the lobed member with a sine-wave profile.

6. The method of claim 1, further comprising:
    retaining the fabric at a first end of the base tool by using a clamp, providing tension to the fabric when aligning the fabric with the grooves of the base tool.

7. A method of fabricating a corrugated laminate panel, comprising:
    (a) providing a base tool having contoured grooves in an outer surface;
    (b) providing a roller having a rotating shaft and providing a flexible strip that, when laid out, has undulations defining lobes that match the contours of the grooves of the base tool, then wrapping the strip around the shaft and fastening ends of the strip together to define a lobed member;
    (c) aligning a layer of prepreg fabric with the grooves of the base tool, the fabric being located between the base tool and the roller; then
    (d) moving the roller across the grooves of the base tool, sequentially engaging each of the grooves and pressing the fabric into the grooves with the lobes; then
    (e) curing the fabric by removing the lobed member and laying it on the base tool with the lobes located in the grooves, then applying pressure and heat to the lobed member to cure the fabric.

8. A method of fabricating a corrugated laminate panel, comprising:
    (a) providing a base tool having contoured grooves in an outer surface;
    (b) providing a roller having a rotating shaft and providing a flexible strip that, when laid out, has undulations defining lobes that match the contours of the grooves of the base tool, then wrapping the strip around the shaft and fastening ends of the strip together to define a lobed member;
    (c) aligning a layer of prepreg fabric with the grooves of the base tool, the fabric being located between the base tool and the roller; then
    (d) moving the roller across the grooves of the base tool, sequentially engaging each of the grooves and pressing the fabric into the grooves with the lobes; then
    (e) curing the fabric by removing the lobed member and laying it on the base tool with the lobes located in the grooves, then enclosing the base tool, the fabric, and the lobed member within a vacuum bag and withdrawing air from within the bag, air pressure outside of the bag forcing the lobed member and base tool toward each other for compacting the fabric.

9. A method of fabricating a corrugated laminate panel, comprising:
    (a) providing a base tool having contoured grooves in an outer surface;
    (b) providing a roller having a rotating shaft and a lobed, elastomeric member, the elastomeric member having lobes that match the contours of the grooves;
    (c) aligning a layer of prepreg fabric with the grooves of the base tool, the fabric being located between the base tool and the roller; then
    (d) installing the fabric onto the base tool by moving the roller across the grooves of the base tool, the lobes sequentially engaging each of the grooves and pressing the fabric into the grooves, the fabric conforming to the contours of the grooves during a pass of the roller over the base tool from a first end of the base tool to a second end of the base tool; then
    (e) repeating steps (c) and (d) with additional layers of fabric to form a multilayered stiffener, the roller applying one of the additional layers of fabric during each pass over the base tool; then
    (f) curing the layers of fabric on the base tool by overlaying the elastomeric member on the layers of fabric, enclosing the base tool, the elastomeric member and the layers of fabric within a vacuum bag, and withdrawing air from within the bag, air pressure outside of the bag compacting the layers of fabric, and then applying heat and additional pressure to the layers of fabric.

10. The method of claim 9, wherein step (d) further comprises
    maintaining a selected tension in the fabric as the lobes press the fabric into the grooves.

11. The method of claim 9, wherein:
    step (b) comprises wrapping the elastomeric member around the shaft; and
    step (f) comprises unrolling the elastomeric member from around the shaft, and positioning the elastomeric member atop the layers of fabric, each fabric groove aligned with and engaged by a lobe from the elastomeric member.

12. The method of claim 9, wherein:

steps (a) and (b) comprise providing the grooves of the base tool and the lobes of the elastomeric member with a sine-wave profile.

13. The method of claim 9, further comprising:

retaining the fabric at a first end of the base tool by using a clamp, providing tension to the fabric when aligning the fabric with the grooves of the base tool.

14. A method of fabricating a corrugated laminate panel, comprising:
  (a) providing a base tool having contoured grooves in an outer surface;
  (b) providing a roller having a rotating shaft and providing a flexible elastomeric strip that, when laid out, has undulations defining lobes that match the contours of the grooves of the base tool, then wrapping the strip around the shaft and fastening ends of the strip together to define an elastomeric member;
  (c) aligning a layer of prepreg fabric with the grooves of the base tool, the fabric being located between the base tool and the roller; then
  (d) installing the fabric onto the base tool by moving the roller across the grooves of the base tool, the lobes sequentially engaging each of the grooves and pressing the fabric into the grooves, the fabric conforming to the contours of the grooves during a pass of the roller over the base tool from a first end of the base tool to a second end of the base tool; then
  (e) repeating steps (c) and (d) with additional layers of fabric to form a multilayered stiffener, the roller applying one of the additional layers of fabric during each pass over the base tool; then
  (f) curing the layers of fabric on the base tool by removing the elastomeric member and laying it on the base tool with the lobes located in the grooves, then applying pressure and heat to the elastomeric member to cure the fabric.

15. A method of fabricating a corrugated laminate panel, comprising:
  (a) providing a base tool having contoured grooves in an outer surface;
  (b) providing a roller having a rotating shaft and providing a flexible elastomeric strip that, when laid out, has undulations defining lobes that match the contours of the grooves of the base tool, then wrapping the strip around the shaft and fastening ends of the strip together to define an elastomeric member;
  (c) aligning a layer of prepreg fabric with the grooves of the base tool, the fabric being located between the base tool and the roller; then
  (d) installing the fabric onto the base tool by moving the roller across the grooves of the base tool, the lobes sequentially engaging each of the grooves and pressing the fabric into the grooves, the fabric conforming to the contours of the grooves during a pass of the roller over the base tool from a first end of the base tool to a second end of the base tool; then
  (e) repeating steps (c) and (d) with additional layers of fabric to form a multilayered stiffener, the roller applying one of the additional layers of fabric during each pass over the base tool; then
  (f) curing the layers of fabric on the base tool by removing the elastomeric member and laying it on the base tool with the lobes located in the grooves, then enclosing the base tool, the stiffener, and the elastomeric member within a vacuum bag and withdrawing air from within the bag, air pressure outside of the bag forcing the elastomeric member and base tool toward each other for compacting the stiffener.

16. A method of fabricating a corrugated laminate stiffener panel, comprising:
  (a) providing a base tool having contoured grooves in an outer surface;
  (b) providing a roller having a rotating shaft, wrapping an elastomeric member around the shaft, and fastening ends of the elastomeric member to each other, the elastomeric member having lobes that match the contours of the grooves;
  (c) aligning a layer of prepreg fabric with the grooves of the base tool, the fabric being located between the base tool and the roller; then
  (d) installing the fabric onto the base tool by moving the roller over the base tool, the lobes sequentially engaging each of the grooves and pressing the fabric into the grooves, the fabric conforming to the contours of the grooves during a pass of the roller over the base tool from a first end of the base tool to a second end of the base tool; then
  (e) repeating steps (c) and (d) with additional layers of fabric to form a multilayered stiffener, the roller applying one of the additional layers of fabric during each pass over the base tool; then
  (f) releasing the ends of the elastomeric member from each other, unwrapping the elastomeric member from the shaft, and placing the elastomeric member over the base tool, the lobes aligning with and locating within the grooves when the elastomeric member is released from the shaft and placed on the base tool; then
  (g) enclosing the base tool, the multilayered stiffener, and the elastomeric member within a vacuum bag and withdrawing air from within the bag, air pressure outside of the bag urging the elastomeric member and base tool toward each other; then
  (h) applying heat to cure the multilayered stiffener on the base tool.

17. The method of claim 16, wherein step (d) further comprises
  maintaining a selected tension in the fabric as the lobes press the fabric into the grooves.

18. A method of fabricating a corrugated laminate panel, comprising:
  (a) providing a base tool having contoured grooves in an outer surface;
  (b) providing a roller having a rotating shaft that match the contours of the grooves;
  (c) aligning a layer of prepreg fabric with the grooves of the base tool, the fabric being located between the base tool and the roller; then
  (d) installing the fabric onto the base tool by moving the roller across the grooves of the base tool, the lobes sequentially engaging each of the grooves and pressing the fabric into the grooves, the fabric conforming to the contours of the grooves during a pass of the roller over the base tool from a first end of the base tool to a second end of the base tool; then (e) repeating steps (c) and (d) with additional layers of fabric to form a multilayered stiffener, the roller applying one of the additional layers of fabric during each pass over the base tool; then (f) curing the layers of fabric on the base tool by overlaying an elastomeric member with lobes that match the contours of the grooves on the layers of fabric, enclosing the base tool, the elastomeric member and the layers of fabric within a vacuum bag, and withdrawing air from within the bag, air pressure outside of the bag compacting the layers of fabric, and then applying heat and additional pressure to the layers of fabric.

19. The method of claim 18, wherein step (d) further comprises:

maintaining a selected tension in the fabric as the lobes press the fabric into the grooves.

* * * * *